(12) United States Patent
Murawaki et al.

(10) Patent No.: US 9,381,467 B2
(45) Date of Patent: Jul. 5, 2016

(54) METAL CARRIER CATALYST FOR CLEANING EXHAUST GAS

(75) Inventors: Keisuke Murawaki, Kakegawa (JP);
Junya Shirahata, Kakegawa (JP);
Yasuo Katou, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 632 days.

(21) Appl. No.: 12/864,482

(22) PCT Filed: Jan. 28, 2009

(86) PCT No.: PCT/JP2009/051818
§ 371 (c)(1),
(2), (4) Date: Jul. 23, 2010

(87) PCT Pub. No.: WO2009/096586
PCT Pub. Date: Aug. 6, 2009

(65) Prior Publication Data
US 2010/0298130 A1   Nov. 25, 2010

(30) Foreign Application Priority Data

Jan. 30, 2008 (JP) ................. 2008-019223

(51) Int. Cl.
| | |
|---|---|
| B01J 23/00 | (2006.01) |
| F01N 3/08 | (2006.01) |
| B01J 19/08 | (2006.01) |
| B01J 8/08 | (2006.01) |
| B01J 8/02 | (2006.01) |
| B01D 53/94 | (2006.01) |

(Continued)

(52) U.S. Cl.
CPC ........... *B01D 53/9445* (2013.01); *B01J 23/464* (2013.01); *B01J 23/892* (2013.01); *B01J 35/04* (2013.01); *B01J 37/0225* (2013.01); *B01J 37/0242* (2013.01); *B01J 37/0244* (2013.01); *F01N 3/281* (2013.01); *B01D 2255/1021* (2013.01); *B01D 2255/1025* (2013.01); *B01D 2255/92* (2013.01); *F01N 2330/02* (2013.01); *Y02T 10/22* (2013.01)

(58) Field of Classification Search
None
See application file for complete search history.

(56) References Cited

U.S. PATENT DOCUMENTS

| | | | | |
|---|---|---|---|---|
| 4,987,034 A | * | 1/1991 | Hitachi et al. | 428/593 |
| 5,791,043 A | * | 8/1998 | Okabe et al. | 29/890 |

(Continued)

FOREIGN PATENT DOCUMENTS

| | | | |
|---|---|---|---|
| EP | 0 705 962 A1 | 4/1996 | |
| EP | 705962 A1 * | 4/1996 | ............ F01N 3/28 |

(Continued)

OTHER PUBLICATIONS

Extended European Search Report for corresponding European Application No. 09706168.3, dated Nov. 15, 2011, 6pp.

(Continued)

*Primary Examiner* — Melvin C Mayes
*Assistant Examiner* — Michael Forrest
(74) *Attorney, Agent, or Firm* — Lewis Roca Rothgerber Christie LLP

(57) ABSTRACT

A metal honeycomb carrier comprising a metal outer casing having inserted thereinto a metal honeycomb structure consisting of a metallic flat foil and a metallic corrugated foil, wherein perforations in an opening ratio of 30 to 60% are provided in either one or both of the flat foil and the corrugated foil.

4 Claims, 3 Drawing Sheets

(51) Int. Cl.
  *B01J 23/46* (2006.01)
  *B01J 23/89* (2006.01)
  *B01J 35/04* (2006.01)
  *B01J 37/02* (2006.01)
  *F01N 3/28* (2006.01)

(56) References Cited

U.S. PATENT DOCUMENTS 6,254,837 B1 * 7/2001 Bruck et al. .................. 422/180
6,761,980 B2 * 7/2004 Sato et al. .................... 428/593
2005/0170957 A1 * 8/2005 Maus et al. .................. 502/439

FOREIGN PATENT DOCUMENTS

| | | |
|---|---|---|
| JP | 5-195763 | 8/1993 |
| JP | 5-309277 | 11/1993 |
| JP | 8-103664 | 4/1996 |
| JP | 11-47613 | 2/1999 |
| JP | 2005-535454 | 11/2005 |
| WO | WO 2004/022937 A1 | 3/2004 |
| WO | WO 2004022937 A1 * | 3/2004 ................ F01N 3/28 |

OTHER PUBLICATIONS

International Search Report, dated May 19, 2009, corresponding to PCT/JP2009/051818.

* cited by examiner

METAL CARRIER CATALYST FOR CLEANING EXHAUST GAS

CROSS REFERENCE TO RELATED APPLICATION

This application is a National Phase Patent Application and claims the priority of International Application Number PCT/JP2009/051818, filed on Jan. 28, 2009, which claims priority of Japanese Patent Application Number 2008-019223, filed on Jan. 30, 2008.

TECHNICAL FIELD

The present invention relates to a metal honeycomb carrier catalyst for cleaning an exhaust gas discharged from internal combustion engines and a metal honeycomb carrier for cleaning an exhaust gas, that can be suitably used for the catalyst.

BACKGROUND ART

Regulations on an exhaust gas are intensified year by year in respective countries and with recent and growing concern over the environmental conservation, such regulations are expected to become more strict in the future. Conventionally, in order to provide a high-performance catalyst having an excellent exhaust gas cleaning performance, not only improvement of the catalyst performance by changing the combination or the like of catalyst active components, that is, noble metals, but also high loading of a noble metal on a catalyst carrier are generally performed.

However, high-performance formulation of a catalyst incurs an increase in the amount of a noble metal used or a growth in the catalyst size, which leads to an increase in the catalyst weight and further causes a problem of cost rise.

In addition, the price of a noble metal tends to elevate every year. Accordingly, development of a carrier or catalyst capable of enhancing the exhaust gas cleaning performance without increasing the amount of a noble metal loaded is being aggressively made in recent years. For example, Kokai (Japanese Unexamined Patent Publication) No. 5-195763 discloses a tandem•metal catalyst carrier where two metal honeycomb bodies are tandemly disposed with spacing in an outer casing and the coupling site of the metal honeycomb carrier on the downstream side to the outer casing works out to the inlet end of the metal honeycomb carrier on the downstream side, thereby enhancing the exhaust gas cleaning performance without increasing the amount of a noble metal loaded.

DISCLOSURE OF THE INVENTION

With respect to the conventional metal (honeycomb) catalyst, as described in Kokai No. 5-195763, several catalysts focused on a turbulence generated in a carrier are disclosed. However, conventional metal (honeycomb) catalysts fail in fully making use of the turbulence generated in a carrier and for enhancing the exhaust gas cleaning ability, it is considered that there is still room for improvement. Furthermore, in the metal (honeycomb) catalyst described in the patent publication mentioned above, two metal honeycomb bodies must be disposed in an outer casing and this is cumbersome from the point of view of production.

An object of the present invention is to provide a metal honeycomb catalyst for cleaning an exhaust gas, which is more excellent in the exhaust gas cleaning performance than ever, and a metal honeycomb carrier suitably usable for the metal honeycomb catalyst.

After careful consideration, the present inventors have found that when a honeycomb body composed of a metal foil having perforations opened in a specific opening ratio is used, an excellent cleaning performance can be ensured with the same volume of a honeycomb and the same amount of a noble metal as those of conventional catalysts while maintaining the durability as a catalyst. This finding led to the present invention.

Furthermore, the present inventors have made studies on the flow passing through a honeycomb body, as a result, it has become apparent that the exhaust gas flow is liable to become a turbulent flow in the vicinity of upstream and downstream sides of the honeycomb body rather than in the middle region. In consideration of this result, an exhaust gas cleaning catalyst more enhanced in the strength and exhaust gas cleaning performance than the catalyst above was obtained by concentrating the perforation part in the upstream and downstream regions without providing perforations in the middle region.

That is, the present invention includes the following inventions.

[1] A metal honeycomb carrier for cleaning an exhaust gas, comprising a metal outer casing having inserted thereinto a metal honeycomb structure consisting of a metallic flat foil and a metallic corrugated foil, wherein perforations in an opening ratio of 30 to 60% are provided in either one or both of said flat foil and said corrugated foil.

[2] The metal honeycomb carrier for cleaning an exhaust gas of [1], wherein perforations are not provided in the middle region in the exhaust gas flow direction.

[3] A metal honeycomb catalyst for cleaning an exhaust gas, using the metal honeycomb carrier for cleaning an exhaust gas of [1] or [2].

EFFECTS OF THE INVENTION

According to the present invention, a metal honeycomb catalyst for cleaning an exhaust gas, which is more excellent in the exhaust gas cleaning performance than ever, and a metal honeycomb carrier suitably usable for the metal honeycomb catalyst, can be provided.

BEST MODE FOR CARRYING OUT THE INVENTION

Figure 1:
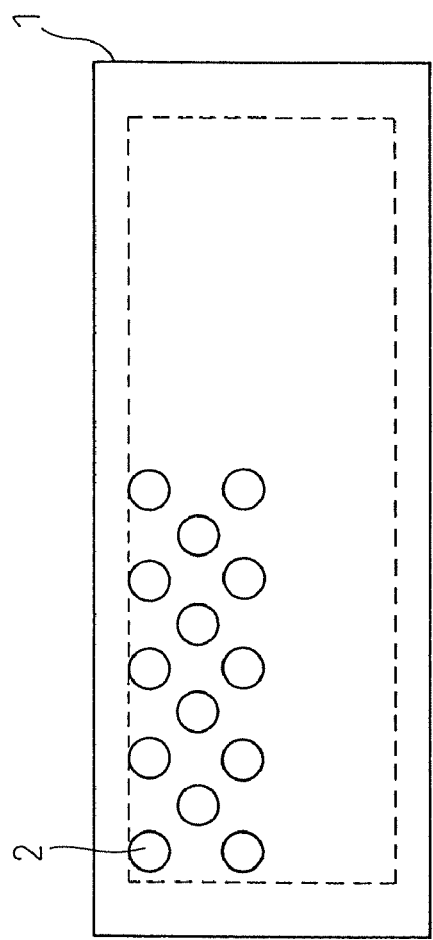
FIG. 1 illustrates one example of a flat foil where perforations in a standard 60° staggered round hole pattern are provided.

Perforated Metal Carrier:

The present invention provides a metal honeycomb carrier for cleaning an exhaust gas, comprising a metal outer casing having inserted thereinto a metal honeycomb structure consisting of a metallic flat foil and a metallic corrugated foil, wherein perforations in an opening ratio of 30 to 60% are provided in either one or both of the flat foil and the corrugated foil. In the context of the present invention, for the sake of differentiation from the normal metal honeycomb carrier without perforations, the metal honeycomb carrier having perforations is sometimes referred to as a "perforated metal carrier".

As compared with the perforated metal carrier of the present invention, a conventional metal honeycomb carrier where no perforation is formed in a corrugated foil or a flat foil of a metal honeycomb structure has the following problem. That is, in the conventional metal honeycomb carrier, a strong turbulent flow may be generated in the vicinity of an exhaust gas inflow region and/or an outflow region, but such a strong turbulent flow is gradually weakened in the course of collision with the corrugated foil and/or flat foil portions in the metal honeycomb structure, resulting in passing of an exhaust gas without fully bringing out the exhaust gas cleaning performance of the catalyst metal supported in the entire honeycomb structure.

Without being bound to any particular theory, in the perforated metal carrier of the present invention, perforations are provided in the corrugated foil part and/or the flat foil part and by virtue of the presence of these perforations, it is believed that an exhaust gas does not merely pass through each through-hole constituting the honeycomb structure, but the exhaust gas diffuses from a certain through-hole to another through-hole and moves actively. More specifically, when perforations are provided in the flat foil part, the exhaust gas is considered to move actively between layers formed to wind around the flat foil, whereas when perforations are provided in the corrugated foil part, the exhaust gas is considered to move actively within a layer.

When an exhaust gas actively moves between layers and/or within a layer, this is considered to make it possible to prevent a turbulent flow generated in a carrier from weakening and thereby to improve the exhaust gas cleaning performance. Furthermore, in the case of the perforated metal carrier of the present invention, perforations are formed in a structure constituting the carrier, so that the weight of the structure itself and in turn the weight of the carrier itself can be reduced.

The perforated metal carrier of the present invention is composed of a metal cell body (metal honeycomb structure) commonly used for metal honeycomb structures and an outer casing. The metal foil constituting the metal honeycomb structure means a metallic flat or corrugated foil in general constituting a metal honeycomb structure. The material of the metal foil is preferably, but not limited to, a material having a low heat capacity and being excellent in the heat resistance, pressure resistance and the like, such as stainless steel or heat-resistant steel. Examples of the stainless steel include steels such as ferrite-based stainless steel and austenite-based stainless steel, and in the present invention, this steel can be used after rolling it into a foil.

On both or either one of the flat foil and the corrugated foil for use in the present invention, perforations are provided. FIG. 1 illustrates one example of the flat foil in which perforations are provided.

Perforations can be provided by entirely punching a metal foil to give a desired opening ratio by means of a punching machine or the like. The hole is not limited in its shape.

The term "opening ratio" as used in the present invention means the ratio of the open hole part in 1 $m^2$ of the surface area of a foil excluding the end parts of the foil (for example, portions outside of the dotted line shown in FIG. 1), wherein the end parts are not perforated. This ratio is generally used in the art using a perforated metal. The opening ratio varies depending on 1) the hole shape, 2) the arrangement•angle of holes, 3) the pitch and 4) the hole-opening range, but the opening ratio in the present invention may be any as long as it has the above-described definition.

Incidentally, the opening ratio used in Examples later indicates a value calculated according to the calculation formula for a so-called "standard 60° staggered round hole" pattern where each of the holes is round and are staggered in an arrangement of making an angle of 60° between lines connecting centers of holes. The opening ratio by standard 60° staggered round holes can be calculated using the following formula:

$$\text{Opening ratio (\%)} = 90.5 \times D^2/P^2$$

(wherein D is the perforation diameter and P is the center pitch).

As a result of studies on the opening ratio by perforations, it has been found that when the opening ratio is less than 30%, the metal honeycomb carrier catalyst for cleaning an exhaust gas, using the perforated metal carrier of the present invention, is reduced in the cleaning performance. This reduction in the cleaning performance is considered to occur because the movement of an exhaust gas between layers or within a layer of a honeycomb structure is insufficient with perforations in an opening ratio of less than 30% and when a catalytic component is disposed on surfaces of a flat foil and/or a corrugated foil, the catalytic component cannot fully make use of a turbulent flow generated in a carrier. Accordingly, the opening ratio by perforations needs to be 30% or more, preferably 40% or more.

On the other hand, as the opening ratio by perforations is larger, an exhaust gas flow more diffuses in various directions and becomes more difficult to block by one through-hole, and the turbulence effect tends to rise. In this case, however, it can reduce the opportunity for an exhaust gas to contact with the flat or corrugated foil when the passes between layers or within a layer wherein a catalytic component is disposed on the surface of a flat or corrugated foil, thereby causing difficulty in obtaining a sufficiently high exhaust gas cleaning performance. Also, as the area of portions other than the perforation part is reduced, the flat or corrugated foil can be deformed when the time for which the carrier is exposed to an exhaust gas is prolonged, which may also make the carrier itself undurable. For these reasons, the opening ratio by perforations needs to be 60% or less, preferably 55% or less.

From the same standpoint as for the opening ratio, the diameter of the round perforation is preferably on the order of 4 to 9 mm, more preferably on the order of 5 to 8 mm.

The number of perforations and the hole interval (pitch) may be appropriately determined by taking the size above into consideration so that the final opening ratio can fall within the range above.

Figure 2:
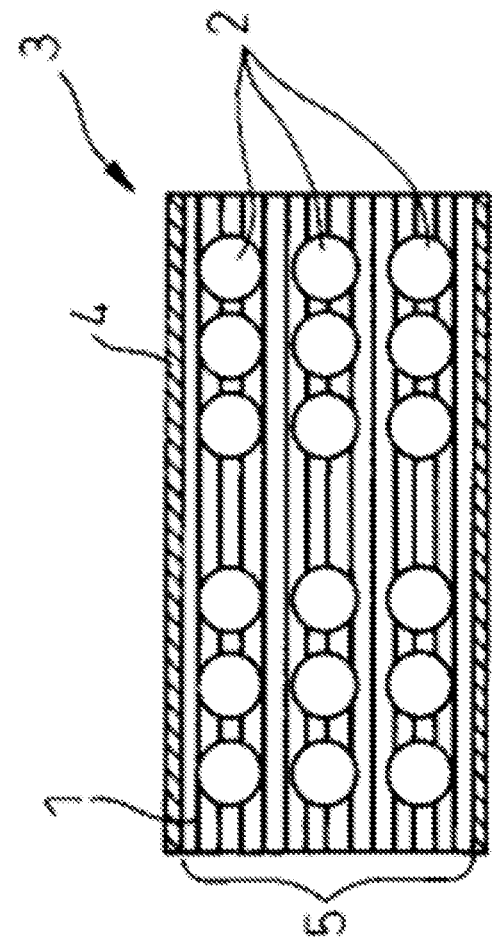
FIG. 2 illustrates the transverse cross-sectional view of a perforated metal carrier.

As described above, the turbulent flow is strong in the vicinity of an exhaust gas inflow region and/or an outflow region, where contact with an outer air readily occurs. On the other hand, in the vicinity of the middle region of the metal honeycomb carrier with respect to the exhaust gas flow direction, the turbulent flow tends to be weakened. For this reason, formation of perforations in the vicinity of the middle region has little advantage. Accordingly, in view of the strength of the metal honeycomb carrier itself or from the standpoint of, for example, suppressing deformation brought about due to exposure of the carrier to an exhaust gas for a long period of time, it is preferred to form no perforation in the vicinity of the middle region of the metal honeycomb structured, as shown in FIG. 2.

Here, the "middle region" of the honeycomb body indicates, when using a metal honeycomb carrier having an axial direction length of about 100 mm, the portion occupying 15% or less around the center of the axial direction length. In this case, the middle region is preferably from 5 to 15% around the center of the axial direction length, as shown in FIG. 2. In using a carrier having an axial direction length in excess of 100 mm, the portion occupying 20 mm or less, preferably from 5 to 20 mm, around the center of the axial direction length is intended. If the region where perforations are not provided is expanded beyond the range above, this is not preferred because, for example, the turbulent flow is weakened. Also, in consideration of the strength and durability of the perforated metal carrier, perforations are preferably not provided in the region of 1.5 cm, preferably 1.0 cm or less, of the end part of the corrugated foil and/or flat foil.

The flat foil and corrugated foil are alternately coiled or stacked to form a honeycomb-shaped "structure".

This structure is inserted into a cylindrical metal outer casing for holding the honeycomb structure, and these are coupled by means of brazing or the like, whereby a "metal honeycomb carrier" is formed. As an example, FIG. 2 illustrates a transverse cross-sectional view of the perforated metal carrier of the present invention.

With respect to the thickness of the metal foil, the thickness is preferably smaller in view of weight reduction, but the thickness should be determined by taking into consideration also the strength of the metal foil. Although not limited, in the present invention, a metal foil having a thickness of approximately from 20 to 200 μm may be used.

Metal Carrier Catalyst for Cleaning Exhaust Gas:

The metal carrier catalyst of the present invention is produced using the above-described perforated metal carrier. Accordingly, the structure itself has characteristic features, and a noble metal or the like as an active component is not limited in its use. A coating layer of all types containing such an active component may be loaded on the surface of the perforated metal carrier. Furthermore, the method for loading is not particularly limited, but a method of repeatedly dipping the perforated metal support in a noble metal solution and thereby effecting the loading may be performed.

The present invention is described in greater detail below by referring to Examples, but the present invention is not limited to these Examples.

EXAMPLES

Example 1

A stainless steel-made flat foil without perforations and a stainless steel-made corrugated foil having perforations entirely provided to give an opening ratio of 50% (diameter: 6 mm, pitch: 8 mm) were prepared, and these foils were alternately coiled to form a honeycomb-shaped structure (200 cells/square inches).

In addition, in all Examples, perforations were not provided in a region within about 1 cm of the edge of the metal foil. Accordingly, the opening ratio in Examples was calculated by excluding such end parts.

Subsequently, the structure was inserted into a stainless steel-made outer casing having a diameter of 53.5 mm, an entire length of 120 mm and a thickness of 1.5 mm and after coating a nickel brazing filler on the inner front surface of the honeycomb and the inner wall of the outer casing, these were coupled in a vacuum furnace at 1,200° C. for 15 minutes to produce a perforated metal carrier.

The carrier obtained was coated with an alumina-based coat (130 g/L) and fired at 500° C. A noble metal solution containing platinum and rhodium was prepared, and the fired metal honeycomb carrier as a whole was repeatedly dipped in the noble metal solution, thereby loading metals, and dried at 250° C. to produce a perforated metal carrier catalyst having formed therein perforations in an opening ratio of 50% (only corrugated foil) (1.0 g of platinum: 0.2 g of rhodium, per 1 L of the carrier volume).

Example 2

A perforated metal carrier catalyst having formed therein perforations in an opening ratio of 50% (only flat foil) was produced using the same materials and method as in Example 1 except for using a flat foil with perforations entirely provided to give an opening ratio of 50% and a corrugated foil without perforations.

Example 3

A perforated metal carrier catalyst having formed therein perforations in an opening ratio of 50% (both flat foil and corrugated foil) was produced using the same materials and method as in Example 1 except for using a flat foil and a corrugated foil each having perforations entirely provided to give an opening ratio of 50%.

Example 4

A perforated metal carrier catalyst in which perforations were entirely provided in both a flat foil and a corrugated foil in the same manner as in Example 3 except for changing the opening ratio to 35% and the perforation diameter to 5 mm, was produced.

Example 5

A perforated metal carrier catalyst in which perforations were entirely provided in both a flat foil and a corrugated foil in the same manner as in Example 3 except for changing the opening ratio to 58%, was produced.

Example 6

A perforated metal carrier catalyst in which perforations (opening ratio: 50%) were provided in both a flat foil and a corrugated foil in the same manner as in Example 3 except for not providing perforations in a region of 10 mm around the center of the axial direction length (in a range of about 15% based on the entire axial direction length) of the honeycomb body, was produced. The weight of this catalyst was 420 g.

Example 7

A perforated metal carrier catalyst in which perforations (opening ratio: 50%) were provided in both a flat foil and a corrugated foil in the same manner as in Example 3 except for not providing perforations in a region of 20 mm around the center of the axial direction length (in a range of about 30% based on the entire axial direction length) of the honeycomb body, was produced.

Comparative Example 1

A metal honeycomb carrier catalyst was produced in the same manner as in Example 1 by using a flat foil and a corrugated foil each having no perforation.

Comparative Example 2

A perforated metal carrier catalyst in which perforations were provided in both a flat foil and a corrugated foil in the same manner as in Example 3 except for changing the opening ratio to 22% and the perforation diameter to 3 mm, was produced.

Comparative Example 3

A perforated metal carrier catalyst in which perforations were provided in both a flat foil and a corrugated foil in the same manner as in Example 3 except for changing the opening ratio to 75% and the perforation diameter to 10 mm, was produced.

Comparative Example 4

A perforated metal carrier catalyst in which perforations (opening ratio: 22%) were provided in both a flat foil and a corrugated foil in the same manner as in Example 3 except for not providing perforations in a region of 25 mm around the center of the axial direction length (in a range of about 15% based on the entire axial direction length) of the honeycomb body, was produced.

Figure 3:
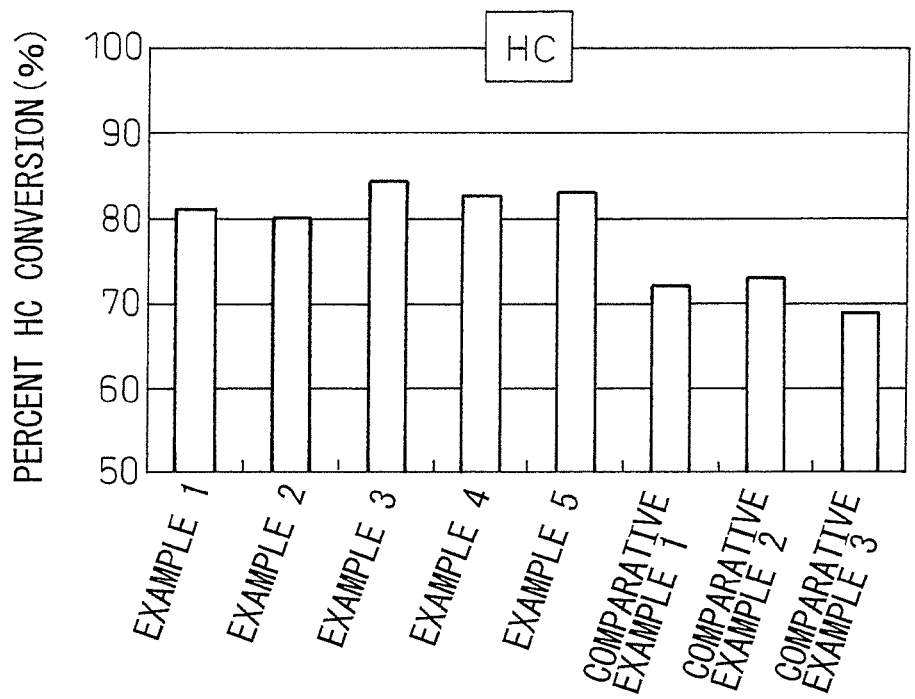
FIG. 3 illustrates the results of a comparison of the percent HC conversion (%) among catalysts of Examples 1 to 7 and Comparative Examples 1 to 4.
Figure 4:
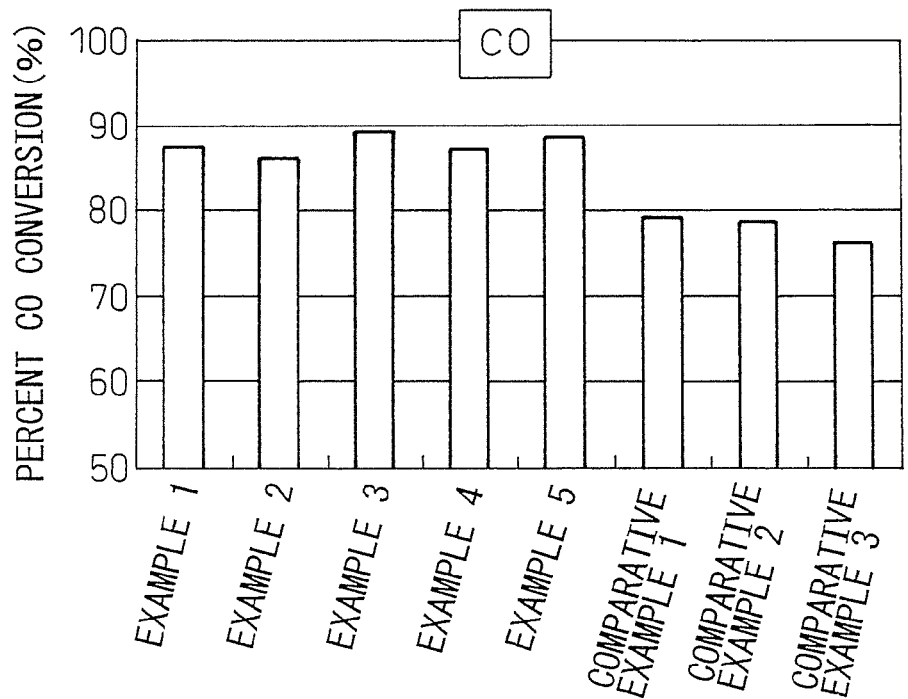
FIG. 4 illustrates the results of a comparison of the percent CO conversion (%) among catalysts of Examples 1 to 7 and Comparative Examples 1 to 4.
Figure 5:
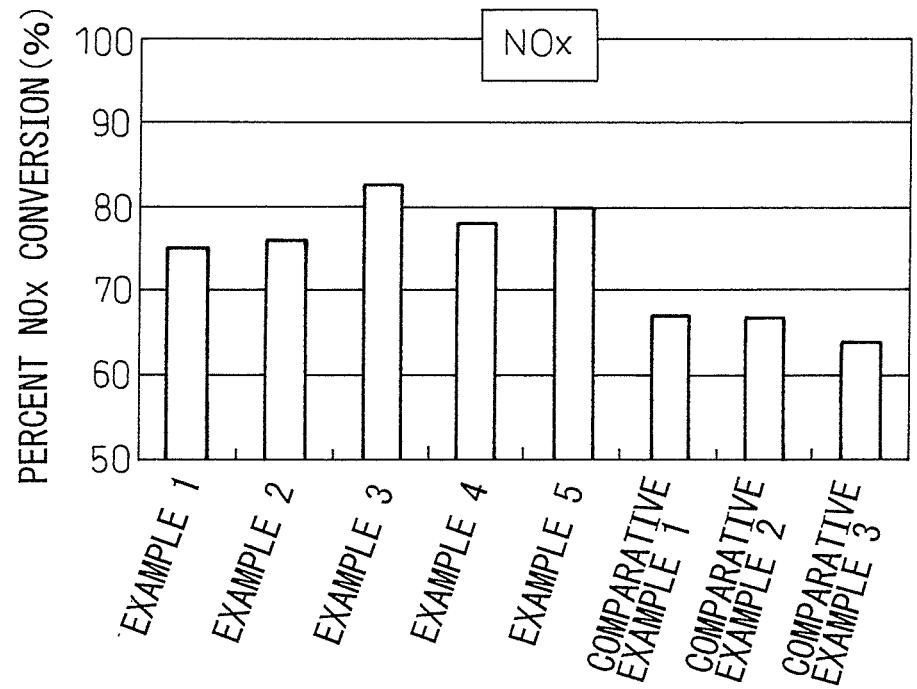
FIG. 5 illustrates the results of a comparison of the percent NOx conversion (%) among catalysts of Examples 1 to 7 and Comparative Examples 1 to 4.

Exhaust Gas Evaluation Test:

In the exhaust gas evaluation test of catalysts of Examples 1 to 7 and Comparative Examples 1 to 4, an exhaust gas cleaning test was performed in the ECE-R40 (ISO6460) evaluation mode by using a chassis dynamo and a vehicle mounted with a four-stroke engine of 900 cc displacement and FI/$O_2$ feedback+AI. FIGS. 3 to 5 illustrate the results on the percent conversion (%) of HC, CO and NOx, respectively.

In all of the catalysts of Examples 1 to 7, the percent conversion was very high as compared with those of Comparative Examples. In particular, the catalysts of Examples 3 to 7 where perforations were provided in both the flat foil and the corrugated foil, the exhaust gas cleaning performance was remarkably enhanced as compared with the case of providing perforations only in either one foil. Furthermore, the catalyst of Example 6 where perforations were not provided in the middle region exhibited a most excellent percent conversion for all exhaust gas components.

As apparent from the results of Comparative Examples 2 and 3, in both cases of a low opening ratio (Comparative Example 2) and a high opening ratio (Comparative Example 3), the catalyst exhibited only an exhaust gas cleaning performance equal to or less than that of a normal metal carrier catalyst without perforations (Comparative Example 1). Also, in the case of not providing perforations in the middle region, when the portion in which perforations were not provided was somewhat wide, the exhaust gas cleaning performance was reduced (Comparative Example 4).

Figure 6:
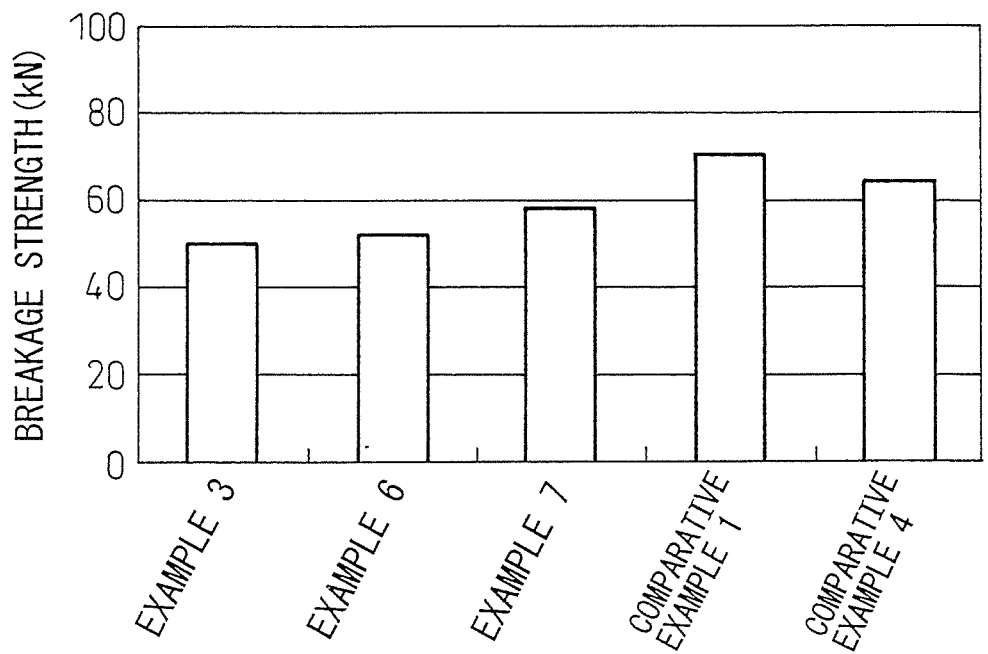
FIG. 6 illustrates the results of a strength test of evaluating the catalysts of Examples 3, 6 and 7 and the catalysts of Comparative Examples 1 and 4 by using an Amsler tester.

Honeycomb Breakage Strength Test:

The catalysts of Examples 3, 6 and 7 and the catalysts of Comparative Examples 1 to 4 were tested for the strength by using an Amsler testing machine (300,000-ton universal testing machine, manufactured by Tokyo Koei Seisakusho). The strength was evaluated by applying a load on the top (at room temperature) and measuring the maximum load until the catalyst was broken. FIG. 6 illustrates the results.

As seen from FIG. 6, in the catalysts of Examples 3, 6 and 7 where perforations were provided, the strength was slightly decreased as Compared with the catalysts of Comparative Examples 1 and 4 but strength high enough to endure practical use was ensured. Above all, the catalyst of Example 7 where perforations were not opened in the middle region was remarkably enhanced in the strength as compared with the catalyst of Example 3 where perforations were provided in the entire surface of the metal foil.

INDUSTRIAL APPLICABILITY

According to the perforated metal carrier of the present invention, perforations are provided in a predetermined opening ratio in the metal foil constituting the metal honeycomb structure, so that the turbulent effect of the exhaust gas passing in the structure can be promoted. As a result, the catalyst using the carrier of the present invention can be enhanced in the exhaust gas cleaning performance without increasing the volume of the catalyst itself. Also, the range where perforations are provided is limited to the upstream and downstream regions, whereby the exhaust gas cleaning performance can be improved while maintaining the strength. Consequently, a metal carrier catalyst for cleaning an exhaust gas, which is enhanced in the mountability and cleaning performance than ever before without decreasing the strength, can be provided. Therefore, the perforated metal carrier of the present invention is suitable for various catalysts, particularly, in view of mountability, for an exhaust gas cleaning catalyst of two-wheeled motor vehicles.

LIST OF REFERENCE NUMERALS IN THE DRAWINGS

Metal foil
Perforation
Perforated metal carrier
Outer casing
Honeycomb body

The invention claimed is:

1. A metal honeycomb carrier for cleaning an exhaust gas, comprising a metal outer casing having inserted thereinto a metal honeycomb structure including a metallic flat foil and a metallic corrugated foil, wherein perforations in an opening ratio of 30 to 60% are provided in either one or both of said flat foil and said corrugated foil, wherein perforations are provided in the upstream and downstream regions in the exhaust gas flow direction, and perforations are not provided in the middle region in the exhaust gas flow direction, and wherein the middle region is from 5 to 15% of an axial direction length of the honeycomb around a center of said axial direction length.

2. A metal honeycomb catalyst for cleaning an exhaust gas, comprising the metal honeycomb carrier for cleaning an exhaust gas according to claim 1.

3. The metal honeycomb carrier for cleaning an exhaust gas according to claim 1, wherein the perforations are round and are staggered in an arrangement of making an angle of 60° between lines connecting centers of the perforations.

4. The metal honeycomb carrier for cleaning an exhaust gas according to claim 1, wherein the opening ratio is 40 to 55°.

* * * * *